(12) United States Patent
Kilgariff et al.

(10) Patent No.: US 7,916,151 B1
(45) Date of Patent: Mar. 29, 2011

(54) PARTIAL TEXTURE LOADS

(75) Inventors: Emmett M. Kilgariff, San Jose, CA (US); Rui M. Bastos, Porto Alegre (BR)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/603,903

(22) Filed: Oct. 22, 2009

Related U.S. Application Data

(62) Division of application No. 11/010,972, filed on Dec. 13, 2004, now Pat. No. 7,609,272.

(51) Int. Cl.
*G06T 1/00* (2006.01)
*G06T 11/40* (2006.01)
*G09G 5/00* (2006.01)

(52) U.S. Cl. .......... 345/582; 345/522; 345/552

(58) Field of Classification Search .......... 345/522, 345/552, 582
See application file for complete search history.

(56) References Cited

U.S. PATENT DOCUMENTS 7,336,275 B2 * 2/2008 Lefebvre et al. .......... 345/426
2003/0009748 A1 * 1/2003 Glanville et al. .......... 717/140
* cited by examiner

*Primary Examiner* — Hau H Nguyen
(74) *Attorney, Agent, or Firm* — Kilpatrick Townsend & Stockton LLP

(57) ABSTRACT

Circuits, methods, and apparatus that provide for partial texture load instructions. Instead of one instruction that may take several shader passes to complete, several instructions are issued, where each instruction is an instruction to retrieve a part or portion of a texture. While each instruction is performed, the other shader circuits can perform other instructions, thus increasing the utilization of the shader circuits when large textures are read from memory. Since several shader passes may be required to read a texture, if a particular instruction needs the texture, one exemplary embodiment reorders instructions such that other instructions are performed before the particular instruction that needs the texture.

20 Claims, 6 Drawing Sheets

- TEXTURES Ø & 2 AVAILABLE
- TEXTURE 1 TO BE READ FROM MEMORY

REORDER

- PERFORM INSTRUCTION 3 WHILE READING TEXTURE 1.

| PASS | CIRCUIT | ACTIVITY |
|---|---|---|
| 1 | SCT | ACTIVE (MUL R0, R0, R0) |
| 1 | TEX / SRB | TEXTURE LOOK UP 0 (R1) |
| 1 | SCB | IDLE |
| 2 | SCT | IDLE |
| 2 | TEX / SRB | TEXTURE LOOK UP 1 (R1) |
| 2 | SCB | IDLE |
| 3 | SCT | IDLE |
| 3 | TEX / SRB | TEXTURE LOOK UP 2 (R1) |
| 3 | SCB | IDLE |
| 4 | SCT | IDLE |
| 4 | TEX / SRB | TEXTURE LOOK UP 3 (R1) |
| 4 | SCB | ACTIVE (MUL R1, R0, R1) |
| 5 | SCT | MUL R2, R2, R2 |
| 5 | TEX / SRB | |
| 5 | SCB | |

410 — MUL R0, R0, R0

415 — MUL R1, R0, R1

420 — MUL R2, R2, R2

FIG. 4

- TEXTURES Ø & 2 AVAILABLE
- TEXTURE 1 TO BE READ FROM MEMORY

⇩ REORDER

- PERFORM INSTRUCTION 3 WHILE READING TEXTURE 1.

| PASS | CIRCUIT | ACTIVITY |
|---|---|---|
| 1 | SCT | ACTIVE (MUL RØ, RØ, RØ) |
| 1 | TEX / SRB | TEXTURE LOOK UP Ø (R1) |
| 1 | SCB | IDLE |
| 2 | SCT | ACTIVE (MUL R2, R2, R2) |
| 2 | TEX / SRB | TEXTURE LOOK UP 1 (R1) |
| 2 | SCB | IDLE |
| 3 | SCT | IDLE |
| 3 | TEX / SRB | TEXTURE LOOK UP 2 (R1) |
| 3 | SCB | IDLE |
| 4 | SCT | IDLE |
| 4 | TEX / SRB | TEXTURE LOOK UP 3 (R1) |
| 4 | SCB | ACTIVE (MUL R1, RØ, R1) |

610 — MUL RØ, RØ, RØ

615 — MUL R2, R2, R2

620 — MUL R1, RØ, R1

FIG. 6

PARTIAL TEXTURE LOADS

CROSS-REFERENCE TO RELATED APPLICATION

This application is a divisional of U.S. patent application Ser. No. 11/010,972, filed Dec. 13, 2004, now U.S. Pat. No. 7,609,272, the disclosure of which is incorporated herein by reference.

BACKGROUND

The present invention relates to instructions used in a graphics processor generally, and more particularly to instructions to read texture information from a memory.

NVIDIA Corporation of Santa Clara, Calif., has developed a revolutionary type of shader for use in graphics processors and similar circuits. This shader receives pixel information (pixel quads) and program instructions, and modifies the pixel information as directed by the program instructions. The shader is made up of several circuits, each of which can typically perform an instruction each shader clock cycle. The several circuits in the shader form a loop around which the pixel information make a number of passes. When the pixel information has been fully processed, the pixels are output from the shader.

One particular instruction is an instruction to read a texture from memory for use by the shader. This instruction is performed by a circuit associated with the shader, specifically a texture circuit or texture filter. This texture circuit may be though of either as a separate circuit from the shader, or simply as a circuit in the shader.

The texture circuit is capable of reading a number of bits from memory during one clock cycle. Unfortunately, a texture is often larger than this number. Accordingly, multiple clock cycles, and therefore multiple passes, are needed to read an entire texture from memory. This has a detrimental effect on shader performance. Since it takes multiple passes, for example 2 or 4 passes through a shader to read a texture, the other shader circuits are not being utilized fully.

Thus, what is needed, are circuit, methods, and apparatus that allow the other circuits in the shader to be utilized while a texture is being read over multiple passes through a shader. Since such as shader could perform several instructions while a texture is being read, it would also be useful if these circuits, methods, and apparatus reorder or rearrange instructions such that other instructions are put ahead of instructions that require the texture that is being read.

SUMMARY

Accordingly, embodiments of the present invention provide circuits, methods, and apparatus that provide for partial texture load instructions. Instead of one instruction that may take several shader passes to complete, several instructions are issued, where each instruction is an instruction to retrieve a part or portion of a texture. While each instruction is performed, the other shader circuits can perform other instructions, thus increasing the utilization of the shader circuits when large textures are read from memory.

Since several shader passes may be required to read a texture, if a particular instruction needs the texture, one exemplary embodiment reorders instructions such that other instructions are performed before the particular instruction that needs the texture. In this way, instructions do not stack up in a queue while a texture is being read. Embodiments of the present invention may incorporate one or more of these or the other features described herein.

Another exemplary embodiment of the present invention provides a method for rendering a computer generated image. This method includes retrieving a first portion of a texture using a first circuit, and while retrieving the first portion of the texture, performing a first instruction using a second circuit. The method also includes retrieving a second portion of the texture using the first circuit, and while retrieving the second portion of the texture, performing a second instruction using the second circuit.

A further exemplary embodiment of the present invention provides a method for rendering a computer generated image. This method includes receiving a first instruction, the first instruction requiring a first texture, the first texture unavailable immediately to a first circuit, then receiving a second instruction, the second instruction requiring a second texture, the second texture available immediately to the first circuit, reordering the first and second instructions, retrieving a first portion of the first texture, and while retrieving the first portion of the first texture, performing the second instruction.

Yet another exemplary embodiment of the present invention provides an integrated circuit. This integrated circuit includes a first circuit configured to compile software and provide instructions, a shader circuit configured to perform instructions provided by the first circuit, and a texture circuit configured to perform partial texture load instructions. A partial texture load instruction is an instruction to make X bits of a texture available to the shader circuit and the texture is larger than X bits in size. The shader circuit is further configured to perform a new instruction each time the texture circuit performs a partial texture load instruction.

A better understanding of the nature and advantages of the present invention may be gained with reference to the following detailed description and the accompanying drawings.

BRIEF DESCRIPTION OF THE DRAWINGS

FIG. 4 is an exemplary portion of a shader program that may be improved by incorporation of an embodiment of the present invention;

FIG. 6 is an exemplary portion of a shader program that is improved by using partial texture load instructions according to an embodiment of the present invention.

DESCRIPTION OF EXEMPLARY EMBODIMENTS

Figure 1:
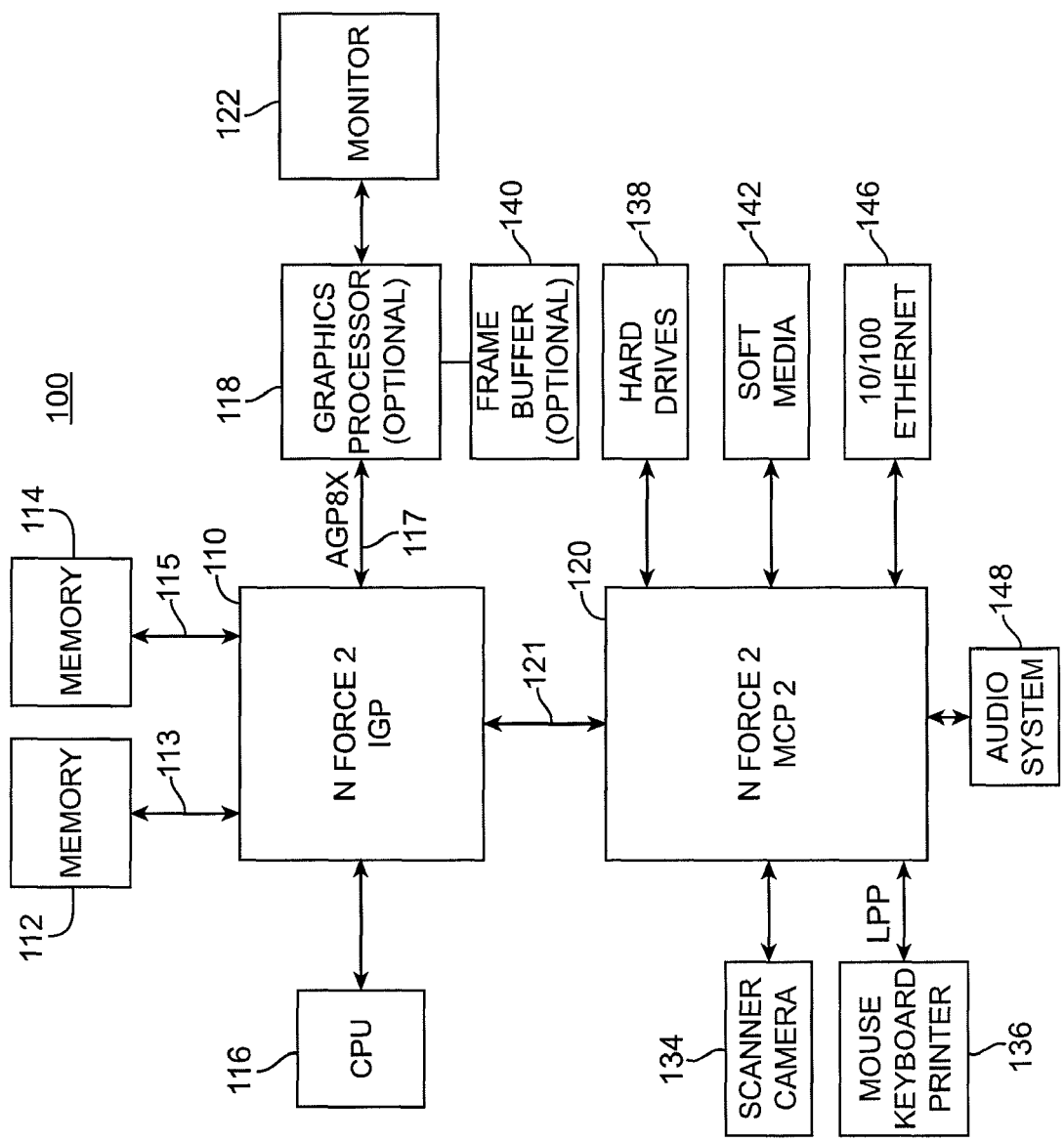
FIG. 1 is a block diagram of an improved computer system 100 that benefits by the incorporation of embodiments of the present invention.

FIG. 1 is a block diagram of an improved computer system 100 that benefits by the incorporation of embodiments of the present invention. The improved computer system 100 includes an NVIDIA nForce™2 integrated graphics processor (IGP) 110, an nForce2 media communications processor (MCP2) 120, memory 112 and 114, CPU 116, optional graphics processor 118 and frame buffer 140, monitor 122, scanner or camera 134, mouse, keyboard, and printer 136, hard drives 138, soft modem 142, Ethernet network or LAN 146, and audio system 148.

This revolutionary system architecture has been designed around a distributed processing platform, which frees up the CPU to perform tasks best suited to it. Specifically, the nForce2 IGP 110 may include a graphics processing unit (GPU) (not shown) which is able to perform graphics computations previously left to the CPU 116. Alternately, the nForce2 IGP 110 may interface to an optional GPU 118 which performs these computations. Also, nForce2 MCP2 120 includes an audio processing unit (APU), which is capable of performing many of the audio computations previously done by the CPU 116. In this way, the CPU is free to perform its tasks more efficiently. Also, by incorporating a suite of networking and communications technologies such as USB and Ethernet, the nForce2 MCP2 120 is able to perform much of the communication tasks that were previously the responsibility of the CPU 116.

In this architecture, the nForce2 IGP 110 communicates with memories 112 and 114 over buses 113 and 115. The nForce2 IGP 110 also interfaces to an optional graphics processor 118 over an advanced AGP bus 117. In various computer systems, optional processor 118 may be removed, and the monitor 122 may be driven by the nForce2 IGP 110 directly. In other systems, there may be more than one monitor 122, some or all of which are coupled to optional graphics processor 118 or the nForce2 IGP 110 directly. The nForce2 IGP 110 communicates with the nForce2 MCP2 120 over a HyperTransport™ link 121. The optional graphics processor 118 may also interface with external memory, which is not shown in this example.

The nForce2 MCP2 120 contains controllers for Ethernet connections 146 and soft modem 142. The nForce2 MCP 120 also includes interfaces for a mouse, keyboard, and printer 136, and USB ports for cameras and scanners 134 and hard drives 138.

This arrangement allows the CPU 116, the nForce2 IGP 110, and the nForce2 MCP2 120, to perform processing independently, concurrently, and in a parallel fashion.

Embodiments of the present invention may be incorporated into an integrated circuit device that performs several functions, such as the nForce2 MCP2 120. Also, they may be incorporated into integrated circuits that are dedicated to performing graphics functions, such as the graphics processor 118 or other dedicated graphics processor. Alternately, they may be incorporated into other types of integrated circuits.

Figure 2:
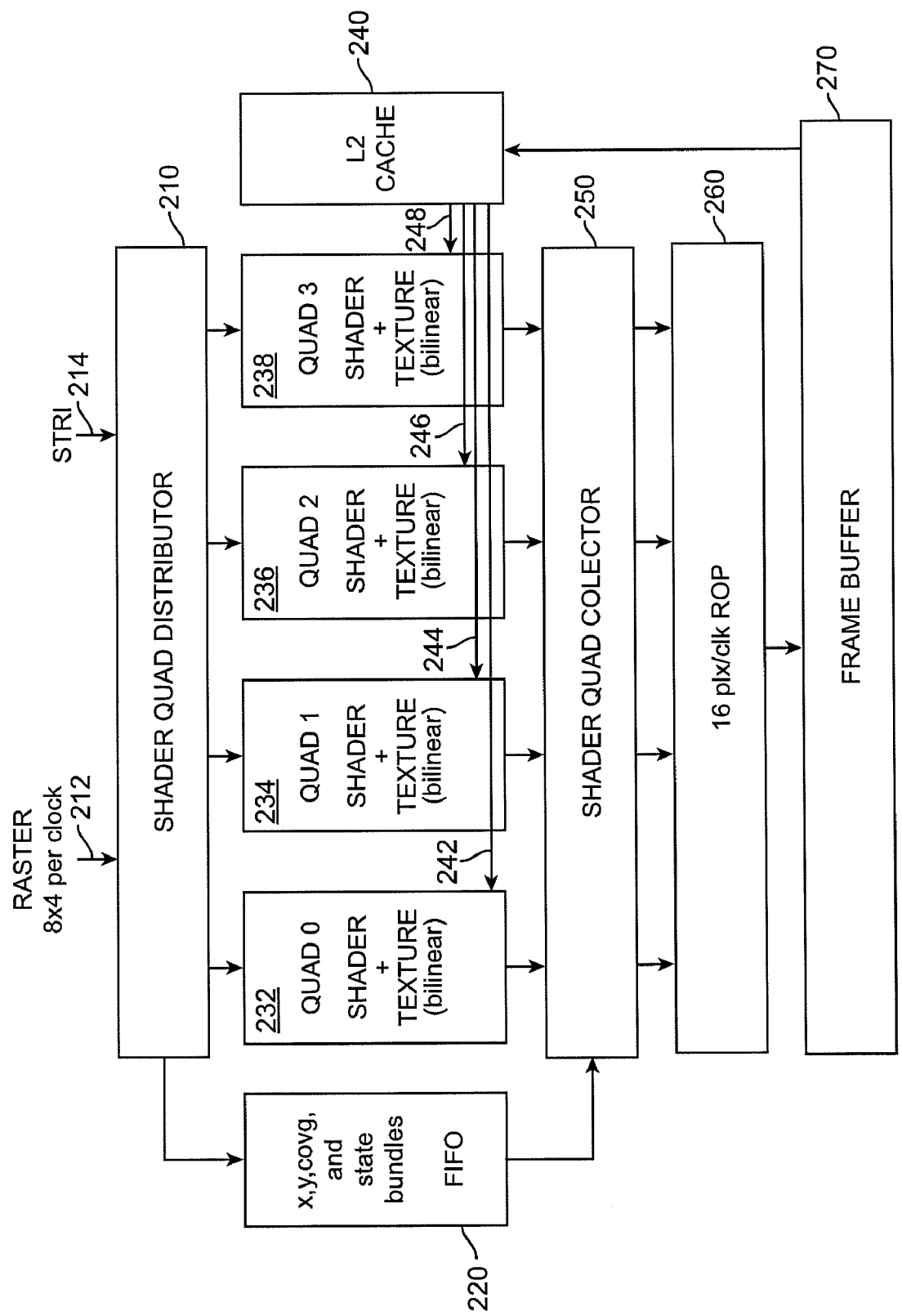
FIG. 2 is a block diagram of a shader and related circuitry that may be improved by incorporating an embodiment of the present invention.

FIG. 2 is a block diagram of a shader and related circuitry that may be improved by incorporating an embodiment of the present invention. This block diagram includes a shader quad distributor 210, X Y, coverage, and state bundle FIFO 220, four shaders including quad 0 232, quad 1 234, quad 2 236, and quad 3 238, level 2 cache 240, shader quad collector 250, raster operations circuit 260, and frame buffer 270. In a typical embodiment of the present invention, the frame buffer 270 to is on a memory integrated circuit, while the other circuits are on a separate integrated circuit, such as a graphics processor. This figure, as with all the included figures, is shown for exemplary purposes only and does not limit either the possible embodiments of the present invention or the claims.

Pixel information is received on lines 212 by the shader quad distributor 210 from a rasterizer circuit (not shown), typically in groups of four that are referred to as pixel quads. Shader instructions are received by the shader quad distributor 210 on lines 214 from a program compiler circuit. The shader quad distributor 210 in turn provides pixel quads to the shaders 232, 234, 236, 238. X, Y, coverage, and state bundle information bypasses the shaders via FIFO 220.

The shaders receive the pixel quads from the shader quad distributor 210. The shaders 232, 234, 236, and 238 receive texture information from the frame buffer 270 via the level 2 cache 240. This texture information may be entire textures, or portions of textures. The shaders and FIFO 220 provide pixels and other information to the shader quad collector 250, which in turn provides them to the raster operations circuit 260. Completed pixels are stored by the raster operations circuit 260 in the frame buffer 270. Similarly, textures are stored in the frame buffer 270 and provided to the level 2 cache 240 for use by the shaders 232, 234, 236, and 238.

Figure 3:
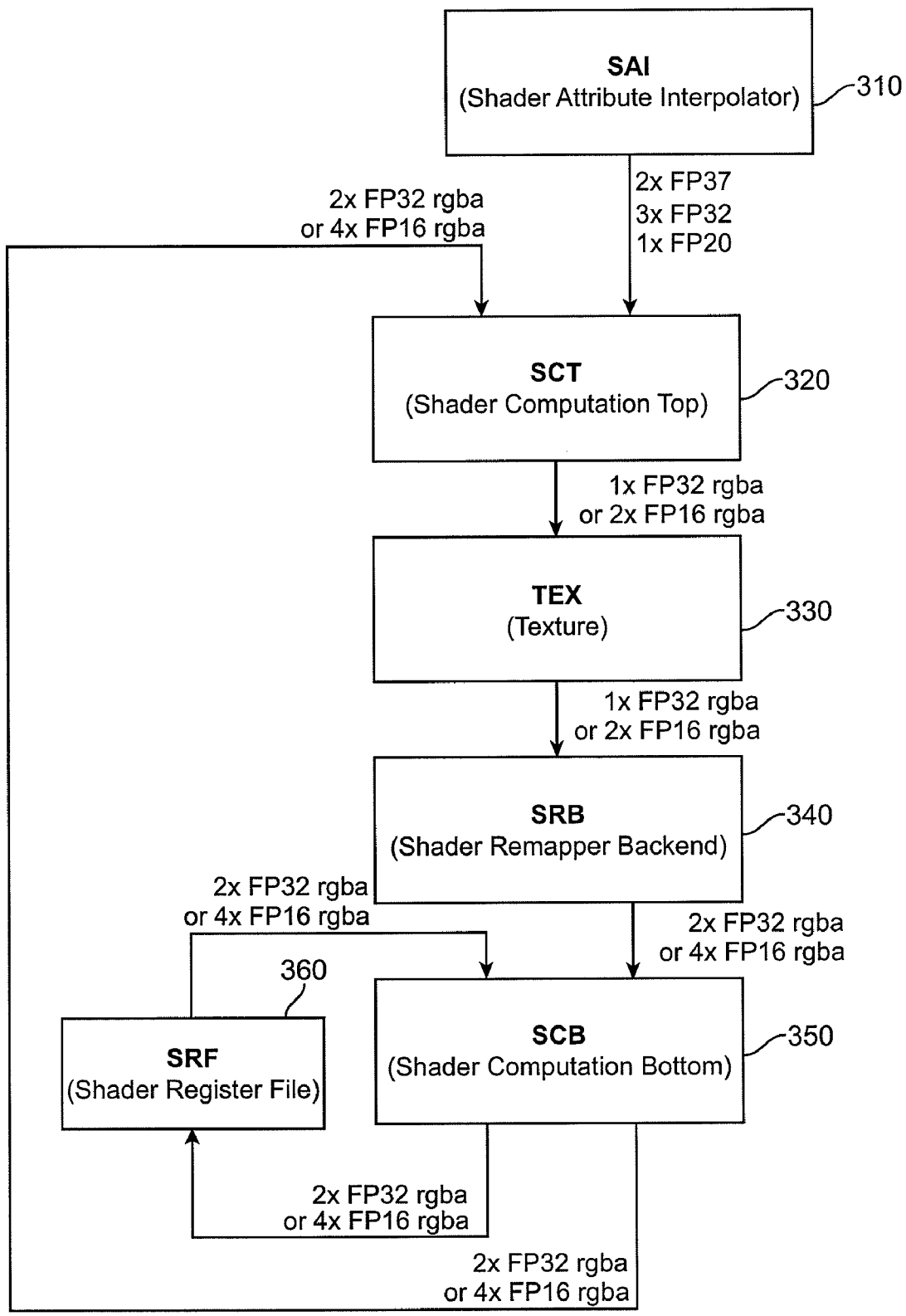
FIG. 3 is a more detailed block diagram of a shader that may be improved by incorporating and embodiment of the present invention.

FIG. 3 is a more detailed block diagram of a shader that may be improved by incorporating embodiments of the present invention. This block diagram includes a shader attribute interpolator 310, shader computation top 320, texture circuit 330, shader mapper back end 340, shader computation bottom 350, and shader register file 360.

Pixel information is received by the shader attribute interpolator 310 from a pixel quad distributor (not shown). The shader attribute interpolator 310 provides pixel information to the shader computation top 320, which in turn provides outputs to the texture circuit 330. The texture circuit 330 receives textures or portions of textures from a frame buffer (not shown). In a specific embodiment, the texture circuit 330 receives textures or texture portions from a frame buffer via a level 2 cache. The texture circuit 330 performs various tasks such as bilinear or trilinear filtering.

The texture circuit 330 provides outputs to the shader remapper backend 340, which in turn provides outputs to the shader competition bottom 350. When the pixels are completed, they are provided to a raster operations circuit (not shown). If processing is not complete, the shader computation bottom provides them back to the shader computation top 320 for further processing. One trip through the shader from the shader computation top 320 to the shader computation bottom 350 and back to the top is referred to as a shader pass.

The texture circuit 330 receives a certain number of bits of information from the level 2 cache during each read cycle. Again however, a texture may be larger than this number of bits. For example in a specific embodiment of the present invention, the texture circuit 330 reads 32 bits at a time from a level 2 cache. In this specific embodiment however, a texture may have one of at least three different sizes, specifically 32 bits, 64 bits, or 128 bits. In this specific embodiment, a 32-bit texture is referred to as a "thin" texture, a 128 bit texture is referred to as a "fat" texture, while a 64-bit texture is referred to as a "semi-fat" texture. Accordingly, one, two, or four read instructions may be needed by the texture circuit 330 to read an entire texture. That is, a texture of 32 bits may be read in a single read cycle, while 64-bit textures are read in two 32-bit portions, while 128 bit textures are read in four 32-bit portions.

Since it can take more than one read cycle to read an entire texture from memory, given the pipelined loop nature of the shader, it can take more than one shader pass to complete an instruction to read a texture. Accordingly, during these extra passes, the computational potential of the other circuits, such as the shader computation top 320, shader remapper back end 340, and shader computation bottom 350, are wasted.

Accordingly, a specific embodiment of the present invention provides instructions for a partial texture load. For example, an instruction may be issued to read one-half of a texture, or one-fourth of a texture. The textures themselves may be divided into two halves, for example, alpha and red in one-half and green and blue in the other half. The texture may then be read using two instructions. Similarly, a texture may be divided in into fourths, for example alpha, red, green, and blue each in one quarter, and read using four instructions. Textures may be divided in other ways as well, for example w, x, y, and z values may be separated in two or more groups, each read with an individual command.

While each of these instructions is being executed by the texture circuit 330, the other circuits may perform other instructions. For example, while the texture circuit 330 is reading a first portion of a texture, the shader computation top 320 and shader competition bottom 350 may be performing first and second instructions. During the next pass, while the texture circuit 330 is reading a second portion of the texture, the shader computation top 320 and shader computation bottom 350 may be performing third and fourth instructions.

FIG. 4 is an exemplary portion of a shader program that may be improved by incorporation of an embodiment of the present invention. In this simple example, the shader performs instructions 410, 415, and 420. In this example, only instructions to read a texture are available, that is, partial texture load instructions are not available. Also, there is no mechanism to reorder the three instructions into a more efficient sequence. As can be seen, five passes through the shader are required to complete the performance of these three instructions.

In this specific example, values stored in registers R0 and R2 are available, while a texture to be stored in R1 is unavailable to the shader and must be retrieved from a frame buffer, for example via a level 2 cache.

During a first pass 430, the shader computational top is active and performs instruction 410, that is it multiplies the contents of register R0 with itself and stores the result in register R0. The texture circuit is also active, and reads the first 32 bits of a texture to be stored in register R1.

During a second pass 440, the texture circuit retrieves more of the texture from memory and stores it in register R1. Similarly, during a third pass 450, a third texture portion read is performed.

On a fourth pass 460, the last bits of the texture are retrieved from memory and stored in R1. A this time, the texture stored in R1 is available to the shader. Accordingly, during the fourth pass 460, during the next clock cycle, the shader computation bottom is active and performs the second instruction 415, that is, it multiplies the contents in register R0 and R1 and stores the product in register R1. During a fifth pass, the shader computational top performs the third instruction 420, that is the contents of register R2 are multiplied and the result stored back in register R2.

Figure 5:
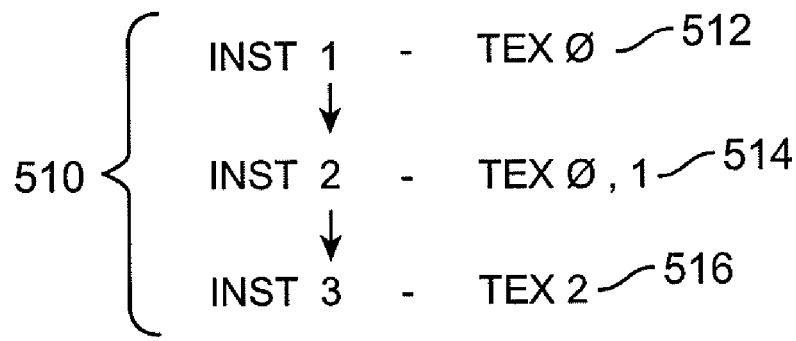
FIG. 5 illustrates a method by which instructions may be reordered according to an embodiment of the present invention.
Figure 5:
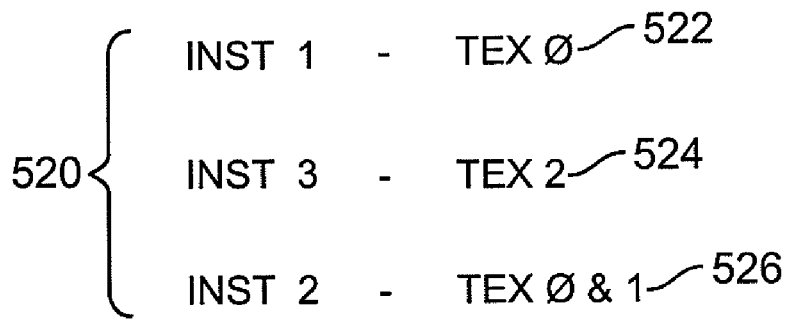

FIG. 5 illustrates a method by which instructions may be reordered according to an embodiment of the present invention. Included are an original sequence of instructions 510 and a reordered sequence of instructions 520. The original sequence of instructions includes instruction 1 512, which requires texture 0, instruction 2 514, which requires textures 0 and 1, and instruction 3 516, which requires texture 2.

In this particular example, textures 0 and 2 are available to the shader in registers, while texture 1 needs to be retrieved from memory. Accordingly, instruction 2 514, since it requires texture 1, cannot be performed immediately if texture 1 requires more than one read cycle to be retrieved.

Accordingly, the instructions are reordered as shown in sequence 520. Sequence 520 includes instruction 1 520, which requires texture 0, followed by instruction 3 524, which requires texture 2, which is followed by the reordered instruction 2 526, which requires textures 0 and 1. In this order, instruction 2 526 is delayed in favor of instruction 3 524. That is, instruction 3 524 is performed while texture 1 is retrieved into R1, such that instruction 2 526 can be completed.

FIG. 6 is an exemplary portion of a shader program that is improved by using partial texture load instructions according to an embodiment of the present invention. In this particular example, the three instructions, 610, 615, and 620, have been reordered relative to the example shown in FIG. 4 to make better use of the shader circuits while the texture to be stored in register R1 is retrieved. As can be seen, only four passes through the shader are required to complete the performance of these three instructions, as compared to the five instructions required in the example of FIG. 4, which did not use partial texture load commands and instruction reordering.

As before, texture values stored in registers R0 and R2 are available, while a texture to be stored in R1 is unavailable to the shader and must be retrieved from a frame buffer, for example via a level 2 cache.

During a first pass 630, the shader computational top is active and performs instruction 610, that is, it multiplies the contents of register R0 with itself and stores the result in register R0. The texture circuit is also active, receives a partial texture load instruction, and reads the first 32 bits of a texture to be stored in register R1.

During a second pass 640, the shader computational top is again active, and performs the reordered second instruction 615, that is, it multiplies the contents of register R2 with itself and stores the result in register R2. The texture circuit is also active, receives a partial texture load instruction, and reads the second 32 bits of a texture to be stored in register R1.

During a third pass 650, a third texture portion read is performed, and the third 32 bits of the texture are stored in register R1.

During a fourth pass 460, the last bits of the texture are retrieved from memory and stored in R1. At this time, the texture stored in R1 is available to the shader. Accordingly, during the fourth pass 460, during the next clock cycle, the shader computation bottom is active and performs the second instruction 415, that is, it multiplies the contents in register R0 and R1 and stores the product in register R1. In this way, by using partial texture loads and instruction reordering, the number of passes through the shader that are required are reduced by one.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method for rendering a computer generated image, the method comprising:
   retrieving a first portion of a texture using a first circuit, the first circuit having a first input that receives the first portion from a memory;
   while retrieving the first portion of the texture, performing a first instruction using a second circuit, the second circuit providing output data to a second input of the first circuit;
   retrieving a second portion of the texture using the first circuit;
   while retrieving the second portion of the texture, performing a second instruction using the second circuit;

receiving, at a third circuit from the first circuit, the entire texture; and performing, with the third circuit, a calculation using the entire texture.

2. The method of claim 1, wherein the first circuit is a texture circuit.

3. The method of claim 2, wherein each texture portion is retrieved by the texture circuit from a memory.

4. The method of claim 3, wherein the second circuit is a shader circuit.

5. The method of claim 4, wherein the texture and shader circuits are on a first integrated circuit and the memory is on a second integrated circuit.

6. The method of claim 5, wherein the first integrated circuit is a graphics processor.

7. The method of claim 1, further comprising:
retrieving a third portion of a texture using the first circuit;
while retrieving the third portion of the texture, performing a third instruction using the second circuit;
retrieving a fourth portion of the texture using the first circuit; and
while retrieving the fourth portion of the texture, performing a fourth instruction using the second circuit.

8. The method of claim 1, further comprising:
reordering a third instruction for performance after the first and second instructions and after the texture is retrieved using the first circuit, then
performing the third instruction using the second circuit.

9. The method of claim 8, wherein the texture is needed by the second circuit when performing the third instruction.

10. The method of claim 1, wherein the first, second, and third circuits are pipelined in a rendering circuit.

11. The method of claim 1, wherein the texture is a pixel texture.

12. The method of claim 1, wherein the first circuit is operable to perform filtering.

13. An integrated circuit comprising:
a first circuit configured to compile software and provide instructions;
a shader circuit configured to perform instructions provided by the first circuit; and
a texture circuit configured to perform partial texture load instructions, wherein a partial texture load instruction is an instruction to retrieve X bits of a texture from a cache and make the X bits of the texture available to the shader circuit when the texture is larger than X bits in size,
wherein the shader circuit is further configured to perform a new instruction each time the texture circuit performs a partial texture load instruction.

14. The integrated circuit of claim 13 wherein the first circuit is further configured to reorder instructions provided to the shader circuit based on availability of textures to the shader circuit.

15. The integrated circuit of claim 14 wherein the texture circuit makes X bits of texture information available to the shader circuit by reading the X bits of texture information from an external memory.

16. The integrated circuit of claim 15 wherein a texture is 2X bits in size.

17. The integrated circuit of claim 15 wherein a texture is 4X bits in size.

18. The integrated circuit of claim 15 wherein the integrated circuit is a graphics processor.

19. The integrated circuit of claim 13, wherein the texture circuit and the shader circuit are pipelined within a shader.

20. A circuit for rendering a computer generated image, the circuit comprising:
a first circuit configured to retrieve a first portion of a texture;
a second circuit having an output connected with an input of the first circuit, wherein the second circuit is configured to perform a first instruction while the first circuit retrieves the first portion of the texture,
wherein the second circuit is further configured to perform a second instruction while the first circuit retrieves the second portion of the texture; and
a third circuit configured to receive the entire texture from the first circuit, wherein the third circuit is configured to perform a calculation using the entire texture, and wherein the second circuit does not include the third circuit.

* * * * *